United States Patent
Nagara et al.

(10) Patent No.: US 7,307,930 B2
(45) Date of Patent: Dec. 11, 2007

(54) OPTICAL DISK APPARATUS

(75) Inventors: Toru Nagara, Tokyo (JP); Yoshio Fukutomi, Chiba (JP)

(73) Assignee: Sony Corporation (JP)

( * ) Notice: Subject to any disclaimer, the term of this patent is extended or adjusted under 35 U.S.C. 154(b) by 647 days.

(21) Appl. No.: 10/961,161

(22) Filed: Oct. 12, 2004

(65) Prior Publication Data
US 2005/0105414 A1 May 19, 2005

(30) Foreign Application Priority Data
Oct. 31, 2003 (JP) .......................... P2003-371535
Dec. 22, 2003 (JP) .......................... P2003-424085

(51) Int. Cl.
*B11B 7/00* (2006.01)
(52) U.S. Cl. .............................. 369/44.37; 369/44.34; 369/44.12
(58) Field of Classification Search ............. 369/44.34, 369/44.37
See application file for complete search history.

(56) References Cited

U.S. PATENT DOCUMENTS

| | | | | |
|---|---|---|---|---|
| 6,160,773 A | * | 12/2000 | Maegawa et al. | 369/44.34 |
| 6,392,967 B1 | * | 5/2002 | Nakayama et al. | 369/44.34 |
| 6,418,096 B1 | * | 7/2002 | Kahlman et al. | 369/44.32 |
| 6,594,210 B2 | * | 7/2003 | Kumagai | 369/47.17 |
| 2003/0072231 A1 | * | 4/2003 | Matsui | 369/47.22 |
| 2004/0184378 A1 | * | 9/2004 | Kwon et al. | 369/53.26 |

FOREIGN PATENT DOCUMENTS

| | | |
|---|---|---|
| JP | 08-279165 | 10/1996 |
| JP | 11-053735 | 2/1999 |
| JP | 2001-338421 | 12/2001 |
| JP | 2001-357544 | 12/2001 |
| JP | 2002-230766 | 8/2002 |
| JP | 2003-178481 | 6/2003 |
| JP | 2003-303414 | 10/2003 |

OTHER PUBLICATIONS

Japanese Office Action dated Jun. 20, 2006; Application No. 2003-371535.
EPO Search Report Dated Mar. 5, 2007; 3 pages.

* cited by examiner

*Primary Examiner*—Wayne Young
*Assistant Examiner*—Vanessa (Brandi) Coleman
(74) *Attorney, Agent, or Firm*—Rader Fishman & Grauer PLLC; Ronald P. Kananen

(57) ABSTRACT

An optical disk apparatus includes a digital signal processor, a photo-detector circuit, and a sample-and-hold circuit. By using a sampling-timing signal generated by the sampling-timing signal based on a sampling-timing signal transmitted from the digital signal processor to the photo-detector circuit through a flexible cable, the sample-and-hold circuit can be operated. Based on a sampling-timing signal dedicated for a side spot, the sample-and-hold circuit can be operated.

6 Claims, 5 Drawing Sheets

SAMPLING POINT

OPTICAL DISK APPARATUS

BACKGROUND OF THE INVENTION

1. Field of the Invention

The present invention relates to an optical disk apparatus for recording onto optical disks such as CD-R (compact disk recordable) and DVD-R (digital versatile disk recordable), and, in particular, to sampling and holding of a photoelectrically converted signal in an optical pickup.

2. Description of the Related Art

A photoelectrically converted signal, which is obtained by a built-in photo-detector circuit in an optical pickup and which corresponds to a semiconductor laser beam reflected by a disk at recording time, has the waveform shown in FIG. 5A. The photoelectrically converted signal is normally transmitted to an RF signal processing circuit through a flexible cable. This is disclosed in, for example, Japanese Unexamined Patent Application Publication No. 11-53735 (page 5, FIG. 1). The RF signal processing circuit calculates signals, such as a servo signal and an APC (automatic emitting-power control circuit) control signal, based on the photoelectrically converted signal input through the flexible cable. To calculate the servo signal, the photoelectrically converted signal must be sampled in periods (the low level periods shown in FIG. 5A) in which the semiconductor laser beam is emitted at a bias power. An increase in recording speed shortens the sampling period. Thus, a signal settling time, which is obtained when a photoelectrically converted signal in the recording period changes to the photoelectrically converted signal in bias periods (the low level periods shown in FIG. 5A), must be reduced.

The above flexible cable electrically acts as a distributed parameter line and has a frequency characteristic having a peak in the vicinity of 150 MHz. Therefore, if the slew rate of an output from the photo-detector circuit is enhanced in order to shorten the settling time, as FIG. 5B shows, ringing 50, which occurs at a bias power portion of the photoelectrically converted signal in the bias period (low level period), only increases. Conversely, the settling time lengthens.

In addition, since enhancing the slew rate represents short-time charging for a capacitive element in the flexible cable and a load capacitance such as an input capacitance of the RF signal processing circuit at a post stage, a circuit current flowing at a final stage of the photo-detector circuit must be increased. This increases the power consumption, and the increased power often exceeds the allowable value in a package. Accordingly, also in this sense, the settling time cannot be shortened. Therefore, it is very difficult to shorten the settling time from the recording power level to the bias power level from the order of ten nanoseconds. This results in the inability to cope with increased recording speed, thus decreasing the servo accuracy. In some cases, tracking servo control is impossible.

Accordingly, in one method, it is possible that, by providing a sample-and-hold circuit in the photo-detector circuit, and sampling and holding the photoelectrically converted signal before performing transmission through the flexible cable, a sampled-and-held signal having a small amplitude is transmitted through the flexible cable. This prevents the signal transmitted through the flexible cable from experiencing a large change in level. Accordingly, the need for a circuit having a large slew rate is eliminated. In addition, a circuit including a hold capacitor whose capacitance is large is not required (up to 11 T of 1×CD, that is, approximately 100 kHz) as the sample-and-hold circuit. Thus, a large current is not required as a driving current in a current-voltage converting circuit at a previous stage. Moreover, since the elimination of the need to drive the flexible cable results in a small load, a slew rate at an initial stage can be sufficiently enhanced, thus shortening a signal settling time.

High speed recording has a high clock frequency. For example, in 16×DVD recording, the clock frequency is approximately 400 MHz. Thus, when signal sampling is performed in a bias power emitting interval (3 T), which is the minimum length, even in the case of performing sampling from 7.5 nanoseconds (4 T), the photoelectrically converted signal must be settled in 10 nanoseconds or less or the sampling cannot be achieved by the present circuit.

Push-pull methods and three-beam methods have conventionally been employed as tracking servo methods for apparatuses for recording on or playing back optical disks. Among these methods, a differential push-pull method is typically used.

The principle of the differential push-pull method is shown in FIG. 6. As shown in FIG. 6, three beam spots (a main spot M and side spots S1 and S2) formed by a diffraction grating are positioned so that the side spots S1 and S2 are disk-radially shifted with respect to the main spot M by half of a track pitch P. Reflected beams from the main spot M and both side spots S1 and S2 are photoelectrically converted by photo-detectors so that push-pull signals can be obtained for the spots M, S1, and S2. The photoelectrically converted signals corresponding to the spots M, S1, and S2 must be sampled in the above-described manner.

Regarding the photoelectrically converted signal corresponding to the main spot M, when considering detection of an address signal, sampling must be performed within a 3 T space, which is the shortest repetition. For the photoelectrically converted signal corresponding to each side spot, only a servo signal needs to be detected. Thus, conventionally, it is preferable to perform signal detection concerning a signal having 6 T or longer. However, there is a problem in that, when the main spot output and each side spot output are sampled with the same sampling timing, a circuit for the side spot must also have a bandwidth and settling characteristic similar to those in a circuit for the main spot. The bandwidth must be extremely broadened, so that the circuit for the side spot does not sufficiently operate. Accordingly, the circuit operation is unstable. For eliminating this defect, design and circuit improvements are required. This causes various problems, such as an increase in circuit size and an increase in production cost. Accordingly, it is preferable that different timing be used for each of the circuit for the main spot M and the circuit for each side spot. However, this complicates a sampling-timing-signal generator, and the number of wires for transmitting sampling-timing signals is increased, thus increasing flexible cable size. This causes a problem in that reduction in apparatus size cannot be achieved.

SUMMARY OF THE INVENTION

The present invention has been made in view of the above circumstances. It is an object of the present invention to provide an optical disk apparatus in which, by only transmitting a sampling-timing signal for a main spot, a photoelectrically converted signal for a side spot is sampled and held to enable reduced flexible cable size, and in which a circuit for the side spot has a narrower band characteristic and a longer settling characteristic compared with a circuit for the main spot.

According to an aspect of the present invention, the above object has been achieved by provision of an optical disk apparatus for obtaining a plurality of servo signals by separating a laser beam into at least two beams, converging the at least two beams on a first spot and at least one second spot on a recording medium, and photoelectrically converting reflected beams from the first spot and the at least one second spot at the time of recording data on the recording medium. The optical disk apparatus includes a first converting unit for converting the reflected beam from the first spot into an electrical signal, a first sample-and-hold unit for sampling and holding the electrical signal obtained by the first converting unit, a second converting unit for converting the reflected beam from the at least one second spot into an electrical signal, a second sample-and-hold unit for sampling and holding the electrical signal obtained by the second converting unit, a signal generating unit for generating, based on a given first sampling-timing signal for determining sampling timing for the first sample-and-hold unit, a second sampling-timing signal for determining sampling timing for the second sample-and-hold unit, and a transmitting unit for transmitting, to signal processing circuits at a subsequent stage, sampled-and-held signals obtained by the first and second sample-and-hold unit.

According to the present invention, wiring for sending the second sampling-timing signal can be omitted to enable reduction in flexible cable size, so that reduction in apparatus size can be achieved.

The bandwidth of the second converting means can be narrower than that of the first converting means, and the settling characteristic of the second converting means can be lengthened. This enables an optimal and inexpensive circuit to be used for the side spot.

Even if a flexible cable is used as the transmitting means, accurate photoelectrically-converted information of the reflected beams can be transmitted to processing circuits at a subsequent stage. In addition, in the settling time from the recording power level at sampling to the bias power level, it is not necessary to drive the flexible cable. Thus, the slew rate of the initial stage can be sufficiently shortened, thus enabling accurate sampling even if recording speed is increased, so that a stable and accurate sampled-and-held signal can be transmitted to the signal processing circuits at the subsequent stage, without being deformed. Accordingly, even at large recording speeds, smooth data recording can be performed.

DESCRIPTION OF THE PREFERRED EMBODIMENT

Figure 1:
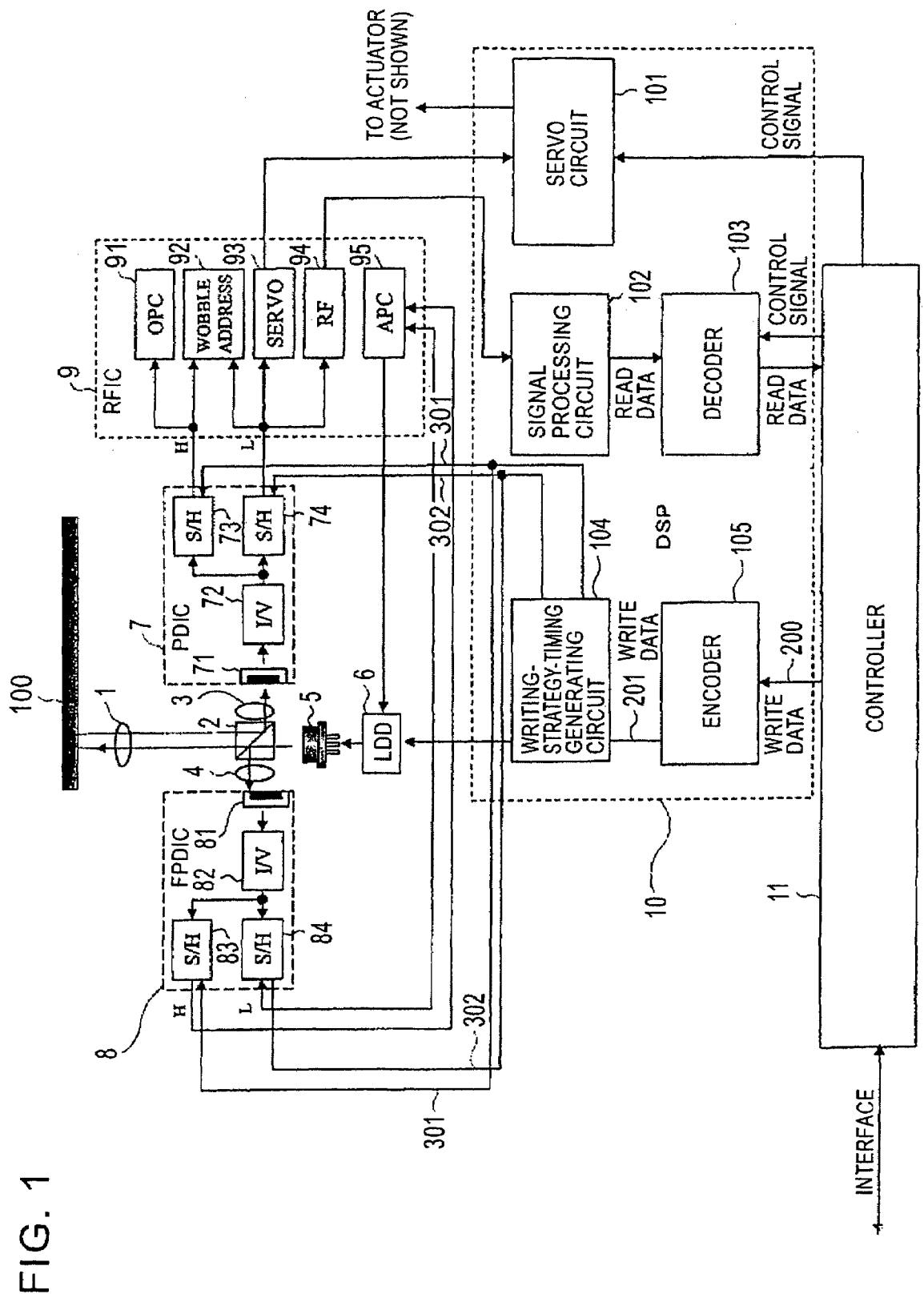
FIG. 1 is a block diagram showing the configuration of an optical disk apparatus according to an embodiment of the present invention.

FIG. 1 is a block diagram showing an optical disk apparatus according to an embodiment of the present invention. The optical disk apparatus includes an objective lens 1, a beam splitter (BS) 2, converging lenses 3 and 4, a semiconductor laser (LD) 5, a laser driving circuit (LDD) for driving the semiconductor laser 5, a photo-detector circuit (PDIC) 7, a front-monitor photo-detector circuit (FPDIC) 8, an RF signal processing circuit 9, a digital signal processor (DSP) 10, and a controller 11.

The photo-detector circuit 7 includes a photo-detector (PD) 71, a current-voltage converter (I/V) 72, and sample-and-hold circuits (S/H) 73 and 74. The front-monitor detector circuit 8 includes a photo-detector (PD) 81, and a current-voltage converter (I/V) 82, and sample-and-hold circuits (S/H) 83 and 84. The RF signal processing circuit 9 includes an optical photo coupler (OPC) 91, a wobble address detecting circuit (indicated by "WOBBLE ADDRESS") 92, a servo-signal generating circuit (indicated by "SERVO") 93, an RF signal generating circuit (indicated by "RF") 94, and an automatic emitting-power control circuit (APC) 95. The digital signal processor 10 includes a servo circuit 101, a signal processing circuit 102, a decoder 103, a write-strategy timing-generating circuit 104, and an encoder 105. The RF signal processing circuit 9 corresponds to a signal processing means in the appended claims.

Figure 2:
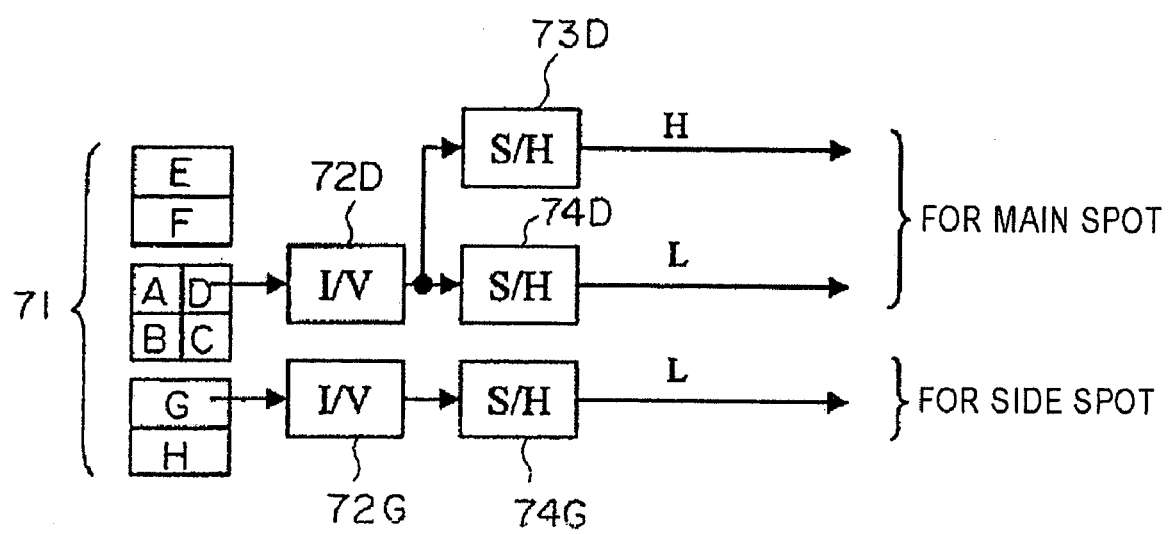
FIG. 2 is a detailed block diagram showing the photo-detector circuit shown in FIG. 1.
Figure 6:
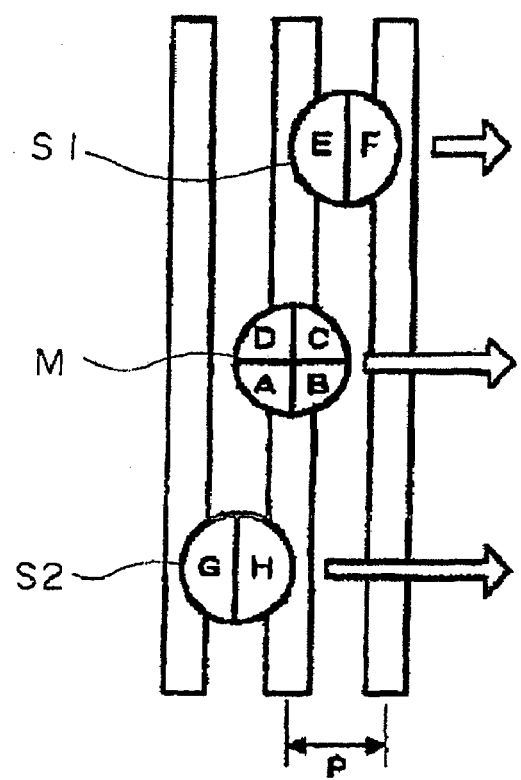
FIG. 6 is a schematic illustration of the positional relationship between a main spot and side spot in a differential push-pull method of the related art.

FIG. 2 is a detailed block diagram showing the photo-detector circuit 7 shown in FIG. 1. As shown in FIG. 6, the photo-detector 71 has photo-receiving areas A to H for receiving portions of a main spot M and side spots S1 and S2. Signals, which are obtained such that reflected beams are converted into corresponding currents in the photo-receiving areas A to H, are converted into voltage signals by current-voltage conversion units. In FIG. 2, for brevity of description, only typical current-voltage conversion units 72D and 72G are shown. The photoelectrically converted signals are sampled and held by sample-and-hold circuits 73D, 74D, and 74G. Circuits corresponding to the photo-receiving areas may also be present. Accordingly, the number of configurations as shown in FIG. 2 is four for the main spot, and the number of configurations as shown in FIG. 2 is four for the side spots. Therefore, there are eight current-voltage converters 72A to 72H, four sample-and-hold circuits 73A to 73D, and eight sample-and-hold circuits 74A to 74H. The photo-receiving areas A to H of the photo-detector 71, and the current-voltage converters 72A, 72B, 72C, and 72D (only 72D is shown in FIG. 2) correspond to a first converting means in the appended claims. The sample-and-hold circuits 74A, 74B, 74C, and 74D (only 74D is shown in FIG. 2) correspond to a first sample-and-hold means in the appended claims. The areas E, F, G, and H of the photo-detector 71, and the current-voltage converters 72E, 72F, 72G (only 72G is shown in FIG. 2), and 72H correspond to a second converting means in the appended claims. The sample-and-hold circuits 74E, 74F, 74G (only 74G is shown in FIG. 2), and 74H correspond to a second sample-and-hold means in the appended claims. The main spot M shown in FIG. 6 corresponds to a first spot in the appended claims. The side spots S1 and S2 shown in FIG. 6 correspond to at least one second spot in the appended claims.

In the following description, the illustrated typical current-voltage converters and sample-and-hold circuits are used.

Next, an operation of writing data to a disk in this embodiment is described below.

The controller 11 outputs write data 200 to the encoder 105. The encoder 105 encodes the write data 200 and outputs encoded write data 201 to the write-strategy timing-generating circuit 104. The write-strategy timing-generating circuit 104 generates write pulses in response to the write data 201, and outputs the generated write pulses to the laser driving circuit 6.

The laser driving circuit 6 performs power control in response to the write pulses by using bias power output. The modulated laser beam is converged on an optical disk 100 through the beam splitter 2 and the objective lens 1. In the writing process, a laser beam reflected by the optical disk 100 is split into two by the beam splitter 2. One split beam is input to the photo-detector 71 in the photo-detector circuit 7, and the other one slit beam is input to the photo-detector 81 in the front-monitor photo-detector circuit 8.

The photo-detector 71 in the photo-detector circuit 7 receives and converts the beam into a corresponding current. The current-voltage converter 72 converts the current into a voltage and outputs the voltage as photo-reception signals to the sample-and-hold circuits 73 and 74. The sample-and-hold circuits 73 and 74 sample and hold the photo-reception signals and transmit the photo-reception signals to the RF signal processing circuit 9 through a flexible cable (not shown).

Similarly, the photo-detector 81 in the front-monitor photo-detector circuit 8 converts the beam into a corresponding current. The current-voltage converter 82 converts the current into a voltage and outputs the voltage as power monitor signals to the sample-and-hold circuits 83 and 84. The sample-and-hold circuits 83 and 84 sample and hold the power monitor signals and transmit the signals to the RF signal processing circuit 9 through a flexible cable (not shown).

The operation of each sample-and-hold circuit used in the photo-detector circuit 7 is described below with reference to FIG. 2.

As shown in FIG. 2, the photo-detector circuit 7 has two circuit systems, that is, a main spot circuit system and a side spot circuit system. Compared with the sample-and-hold circuits 73D and 74D for the sample-and-hold circuits 73D and 74D for the main spot, the sample-and-hold circuit 74G for the side spot has a narrower bandwidth and its settling characteristic is designed to be longer.

Accordingly, in this embodiment, based on a sampling-timing signal 302 for the main spot that is generated by the write-strategy timing-generating circuit 104, the photo-detector circuit 7 generates a sampling-timing signal for operating the sample-and-hold circuit 74G for the side spot.

Figure 3:
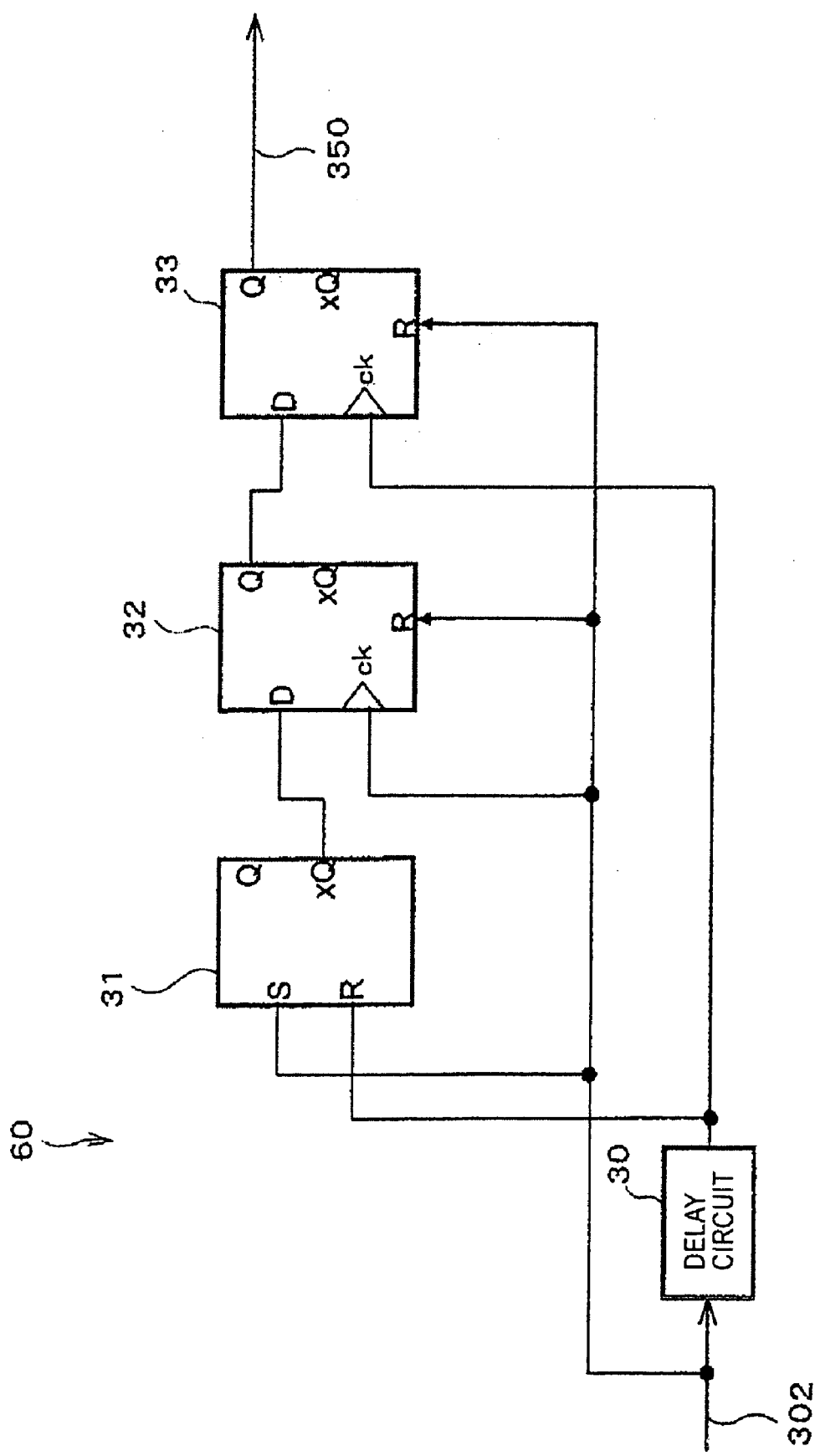
FIG. 3 is a block diagram showing a built-in sampling-timing-signal generating circuit in the photo-detector circuit shown in FIG. 1.

FIG. 3 is a block diagram showing a circuit that generates a sampling-timing signal 350 for the side spot circuit system based on the sampling-timing signal 302. A sample-timing generating circuit 60 includes a delay circuit 30, an SR flip-flop 31, and D flip-flops 32 and 33. The setting terminal (S) and resetting terminal (R) of the SR flip-flop 31 can respectively act to perform setting and resetting operations at rising edges. The resetting terminals (R) of the D flip-flops 32 and 33 can respectively act to perform resetting operations at rising edges.

Figures 4A, 4B, 4C, 4D, 4E:
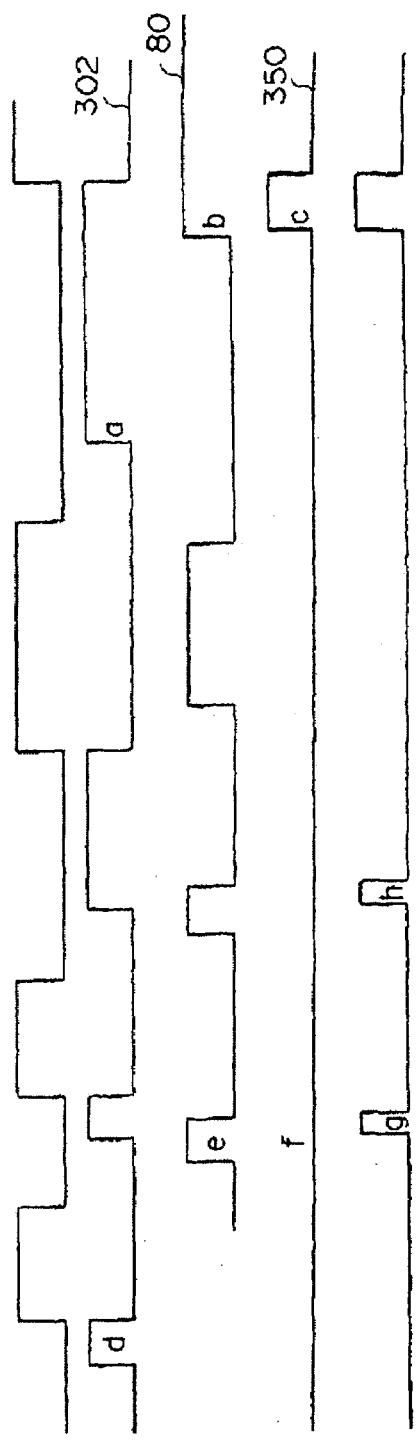
FIG. 4, consisting of FIG. 4A, 4B, 4C, 4D, and 4E, is a timing chart illustrating the operation of the sampling-timing-signal generating circuit shown in FIG. 3.
Figure 5A:
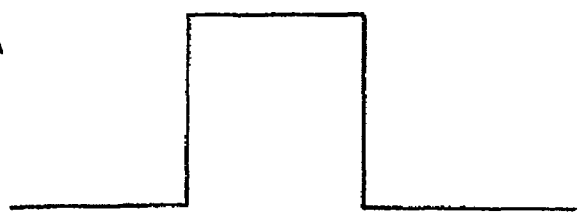
FIGS. 5A and 5B are graphs showing changes in the waveform of a signal when it passes through a flexible cable of the related art.
Figure 5B:
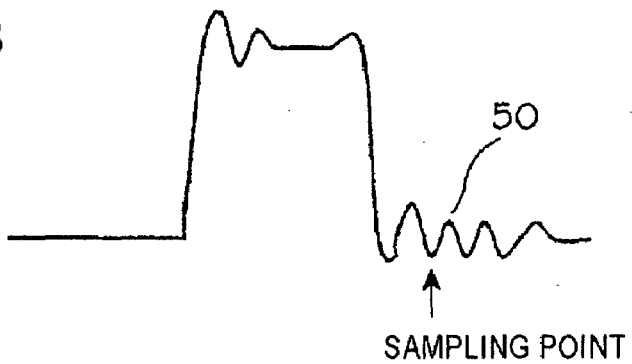

The sampling-timing signal 302 shown in FIG. 4B is originally used for sampling and holding in the main spot circuit system. Thus, it is directly input to a sample-and-hold circuit in the main spot circuit system. In other words, the sampling-timing signal 302 is directly input to the sample-and-hold circuit 74D in the main spot circuit system. The sample-and-hold circuit 74D samples low-level-period portions of the photoelectrically converted signal (corresponding to write data) in high level periods of the sampling-timing signal 302, which is input to the sample-and-hold circuit 74D. The sample-and-hold circuit 73D in the main spot circuit system operates based on the sampling-timing signal 301.

In the case of generating the sampling-timing signal 350 shown in FIG. 4D by the sample-and-hold circuit 74G based on the sampling-timing signal 302, by generating the sampling-timing signal 350 when the sampling-timing signal 302 has the long period indicated by reference letter a shown in FIG. 4B, the generated sampling-timing signal 350 has a narrow bandwidth and a long settling characteristic, and is adapted for the current-voltage converter 72G in the side spot circuit system.

The sampling-timing signal 302 is input to the sample-and-hold circuit 74D and is also input to the delay circuit 30, so that the delayed signal 80 shown in FIG. 4C is generated and is input to the resetting terminal (R) of the SR flip-flop 31. The sampling-timing signal 302 is input to the setting terminal (S) of the SR flip-flop 31. The output of the inverted output terminal (xQ) of the SR flip-flop 31 is input to a data terminal (D) of the D flip-flop 32, and the sampling-timing signal 302 is input to a clock terminal (ck) and resetting terminal (R) of the D flip-flop 32. The clock terminal (ck) acts to operate at a rising edge. The resetting terminal (R) acts to operate at a falling edge. The output of the output terminal (Q) of the D flip-flop 32 is input to a data terminal (D) of the D flip-flop 33. The delayed signal 80 is input to the D flip-flop 33. The sampling-timing signal 302 is input to the resetting terminal (R) of the D flip-flop 33. The clock terminal (ck) of the D flip-flop 33 also acts to operate at a falling edge, and the resetting terminal (R) of the D flip-flop 33 acts to operate at a falling edge.

In a state in which the SR flip-flop 31 is reset when the sampling-timing signal 302 is at low level and the delayed signal 80 is also at low level, the inverted output (xQ) of the SR flip-flop 31 is at high level. This allows the D flip-flop 32 to be operable since a high level signal is input to the data terminal (D) of the D flip-flop 32, so that the output of the output terminal (Q) is at low level.

At this time, at an edge at which the sampling-timing signal 302 is at high level as denoted by reference letter a shown in FIG. 4B, the D flip-flop 32 operates, and its output terminal (Q) becomes high in level, and the SR flip-flop 31 is set, so that the output of the inverted output terminal (xQ) becomes low in level. When the output terminal (Q) of the D flip-flop 32 becomes high in level, the data terminal (D) of the D flip-flop 33 becomes high in level. This allows the D flip-flop 33 to be operable. However, the output (similar to the sampling-timing signal 350) of the output terminal (Q) of the D flip-flop 33 is still at low level.

Before the sampling-timing signal 302 rises in this state, when the delayed signal 80 changes to be in a high level, as denoted by reference letter b, the D flip-flop 33 operates and its output Q becomes high in level, so that the sampling-timing signal 350 rises as denoted by reference letter c. Then, the delayed signal 80 resets the SR flip-flop 31, and the output of the inverted output terminal xQ becomes high in level. In this state, when the sampling-timing signal 302 rises in low level, the D flip-flops 32 and 33 are reset, and the output of the output terminal Q of the D flip-flop 33 becomes low in level, thus causing the sampling-timing signal 350 to fall. After all, the sampling-timing signal 350 is output with a delay for the sampling-timing signal 302.

However, although the sampling-timing signal 302 falls as denoted by reference letter d in FIG. 4B, when the sampling-timing signal 302 falls before the delayed signal 80 changes to be in high level, the D flip-flop 33 is reset and its output terminal Q has a low level output. In this state, even if the delayed signal 80 rises as denoted by reference letter e in FIG. 4C, the D flip-flop 33 does not operate and its output terminal Q remains to have a low level output, so that the sampling-timing signal 350 is not output as denoted by reference letter f in FIG. 4D. Therefore, by preventing the sampling-timing signal 302 from being mistakenly output as denoted by reference letters g and h when the sampling-timing signal 302 is short, the sampling-timing signal 350, which is suitable for the sampling and holding operation of the sample-and-hold circuit 74G for the side spot circuit system, is generated.

Therefore, it may be said that the sampling-timing generating circuit 60 shown in FIG. 3 is a circuit in which, after the sampling-timing signal 302 rises, before the sampling-timing signal 302 falls, only when the delayed signal 80 rises does the circuit output the sampling-timing signal 350.

When the photoelectrically converted signal shown in FIG. 4A, which is input, has long bias periods (low level periods) as denoted by reference letter i, the sample-and-hold circuit 74G in the side spot circuit system samples and holds the above photoelectrically converted signal in the bias periods based on the sampling-timing signal 350 shown in FIG. 4D. In addition, the sample-and-hold circuit 74D performs a sampling and holding operation based on the sampling-timing signal 302. The sample-and-hold circuit 74D does not use a sampling-timing signal separately generated as described above.

The sample-and-hold circuits 83 and 84 used in the front-monitor photo-detector circuit 8 are identical in configuration to the sample-and-hold circuit 73 used in the photo-detector circuit 7. In this case, the sample-and-hold circuits 83 and 84 have no distinction for a main spot and side spots, and are all equivalent to those for the main spot. Thus, the sample-and-hold circuits 83 and 84 perform sampling and holding operations based on the sampling-timing signals 301 and 302.

A signal held by the sample-and-hold circuit 73 in the photo-detector circuit 7 is transmitted to the optical photo coupler (OPC) 91 and the wobble address detecting circuit 92 in the RF signal processing circuit 9 through the flexible cable. A signal held by the address counter 74 is transmitted to the wobble address detecting circuit 92, the servo-signal generating circuit 93, and the RF signal generating circuit 94, and the frequency characteristics and level of the read signal are shaped to generate an RF signal.

A signal held by the sample-and-hold circuit 83 in the front-monitor photo-detector circuit 8 is transmitted to the APC 95 in the RF signal processing circuit 9, and a signal held by the adaptive filter 84 is also transmitted to the APC 95 through the flexible cable.

The optical photo coupler (OPC) 91 in the RF signal processing circuit 9 finds an optical recording output level of the semiconductor laser 5 based on the level of the photo-reception signal in the recording period, and sets the optical recording output level in the APC 95. The APC 95 performs control in which, based on the level of a power monitor signal in the recording and bias periods, the emission power of the semiconductor laser 5 is used as a set value.

The servo-signal generating circuit 93 calculates, based on a sampling signal of the photo-reception signal in the bias period, various servo signals, and outputs the calculated signals to the servo circuit 101 in the digital signal processor 10. The servo circuit 101 generates, based on the input servo signals, a servo signal for driving an actuator (not shown), and outputs the servo signal to the actuator. This performs tracking control and focusing control of the optical pickup including the photo-detector circuit 7, the front-monitor photo-detector circuit 8, and the optical system (the semiconductor laser 5, the beam splitter 2, the objective lens 1, etc.).

Based on the sampling signals of the photo-reception signals in the recording period and the bias period, the wobble address detecting circuit 92 detects an absolute address. Based on the address, the controller 11 constantly monitors a position on the optical disk 100 at which data is currently recorded. When no data is recorded at a predetermined position, the servo circuit 101 is controlled to perform an operation, such as re-recording. In addition, the controller 11 performs on-off control of the encoder 105, the spindle motor 103, and the servo circuit 101, and controls the apparatus entirety. Specifically, the controller 11 controls the entirety to reflect a user's instructions input through an interface such as an operation panel (not shown), and to display an apparatus status on a display of the operation panel.

When the optical disk 100 is played back, the sampled-and-held signals are input from the sample-and-hold circuit 74 in the photo-detector circuit 7 and the sample-and-hold circuit 84 in the front-monitor photo-detector circuit 8 to the RF signal generating circuit 94. The RF signal generating circuit 94 in the RF signal processing circuit 9 processes the input sample-and-hold circuit into an RF signal by equalizing the frequency of the input sampled-and-held signal and shaping the level of the input sampled-and-held signal, and outputs the RF signal to the signal processing circuit 102 in the digital signal processor 10. The signal processing circuit 102 binarizes the RF signal into read data and outputs the read data to the decoder 103. The decoder 103 decodes the read data into user data and outputs the user data to the controller 11. The operations of the servo-signal generating circuit 93 and the servo circuit 101 are similar to those in the recording time. In addition, the APC 95 controls, based on the sampled-and-held signal input from the sample-and-hold circuit 84, the semiconductor-laser emission power at a predetermined constant level.

In this embodiment, the sampling-timing signals 301 and 302 are transmitted from the digital signal processor 10 to the photo-detector circuit 7 through the flexible cable. However, by using the sampling-timing signal 350 generated by the sampling-timing generating circuit 60 in the photo-detector circuit 7 based on the sampling-timing signal 302, the sample-and-hold circuit 74G for the side spot is operated. Therefore, it is not necessary for the digital signal processor 10 to transmit, to the photo-detector circuit 7, a dedicated sampling-timing signal for operating the sample-and-hold circuit 74G for the side spot. Accordingly, by reducing the number of wires in the flexible cable, the size of the flexible cable can be prevented from being increased. This contributes to a reduction in apparatus size.

Based on the sampling-timing signal 302 and the delayed signal 80 of the sampling-timing signal 302, the sampling-timing signal 350 is generated. In this generating process, after the sampling-timing signal 302 rises and before the sampling-timing signal 302 falls, only when the delayed signal 80 rises does the sampling-timing generating circuit 60 output the sampling-timing signal 350. This can generate the sampling-timing signal 350, which is free from a pseudo-component and is accurate.

In addition, since the sample-and-hold circuit 74G for the side spot is operated based on the sampling-timing signal 350, which is dedicated therefor, a circuit for the side spot is set to have a narrow bandwidth and long settling. This can reduce circuit size and cost.

Moreover, the photo-detector circuit 7 and the front-monitor photo-detector circuit 8 sample photo-reception signals and power-monitor signals and send sampled-and-held signals to the RF signal processing circuit 9 at the subsequent stage through the flexible cable. Therefore, in each of the photo-detector circuit 7 and the front-monitor photo-detector circuit 8, in the settling time from the recording power level at sampling to the bias power level, it is not necessary to drive the flexible cable. Thus, the slew rate of the initial stage can be sufficiently shortened, thus enabling accurate sampling even if recording speed is increased, so that a stable and accurate sampled-and-held signal can be transmitted to the RF signal processing circuit 9. This enables various types of signal processing in the RF signal processing circuit 9 to be accurately and stably performed. Accordingly, even at large recording speed, smooth data recording can be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An optical disk apparatus for obtaining a plurality of servo signals by separating a laser beam into at least two beams, converging said at least two beams on a first spot and at least one second spot on a recording medium, and photoelectrically converting reflected beams from the first spot and said at least one second spot at the time of recording data on the recording medium, the optical disk apparatus comprising:

first converting means for converting the reflected beam from the first spot into an electrical signal;

first sample-and-hold means for sampling and holding the electrical signal obtained by the first converting means;

second converting means for converting the reflected beam from said at least one second spot into an electrical signal;

second sample-and-hold means for sampling and holding the electrical signal obtained by the second converting means;

signal generating means for generating, based on a given first sampling-timing signal for determining sampling timing for the first sample-and-hold means, a second sampling-timing signal for determining sampling timing for the second sample-and-hold means; and transmitting means for transmitting, to signal processing circuits at a subsequent stage, sampled-and-held signals obtained by the first and second sample-and-hold means.

2. The optical disk apparatus according to claim 1, wherein, based on the generated second sampling-timing signal, the second sample-and-hold means samples and holds the electrical signal obtained by the second converting means in a period in which the laser beam is emitted at a bias power level.

3. The optical disk apparatus according to claim 1, wherein, the signal generating means generates the second sampling-timing signal based on the first sampling-timing signal and a delayed signal obtained by delaying the first sampling-timing signal.

4. The optical disk apparatus according to claim 3, wherein, before the first sampling-timing signal falls, the signal generating means generates the second sampling-timing signal only when the delayed signal rises.

5. The optical disk apparatus according to claim 1, wherein the first and second converting means, the first and second sample-and-hold means, and the signal generating means are integrated into a single chip circuit.

6. The optical disk apparatus according to claim 1, wherein, when the first spot is a main spot and the second spots are side spots, each of the side spots is radially disposed on the recording medium in a form shifted with respect to the main spot by half of a track pitch.

* * * * *

UNITED STATES PATENT AND TRADEMARK OFFICE
CERTIFICATE OF CORRECTION

| | |
|---|---|
| PATENT NO. | : 7,307,930 B2 |
| APPLICATION NO. | : 10/961161 |
| DATED | : December 11, 2007 |
| INVENTOR(S) | : Toru Nagara et al. |

Page 1 of 1

It is certified that error appears in the above-identified patent and that said Letters Patent is hereby corrected as shown below:

On the title page
Item (30) should read:
-- Oct. 31, 2003   (JP)   …………………….....P2003-371535 --.

Signed and Sealed this

Twenty-fourth Day of June, 2008

JON W. DUDAS
*Director of the United States Patent and Trademark Office*